Figure 1:
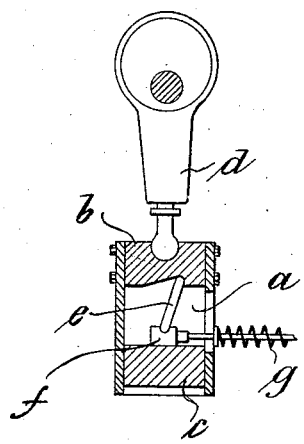

No. 868,995. PATENTED OCT. 22, 1907.
L. KNÖCHL.
ABUTMENT PRESSURE REGULATOR.
APPLICATION FILED JAN. 26, 1907.

2 SHEETS—SHEET 1.

Witnesses:
Harry O. Rueth
G. M. Copenhaver

Inventor:
Leo Knöchl,
by Annie Goldsborough,
Attys

No. 868,995.  PATENTED OCT. 22, 1907.
L. KNÖCHL.
ABUTMENT PRESSURE REGULATOR.
APPLICATION FILED JAN. 26, 1907.
2 SHEETS—SHEET 2.
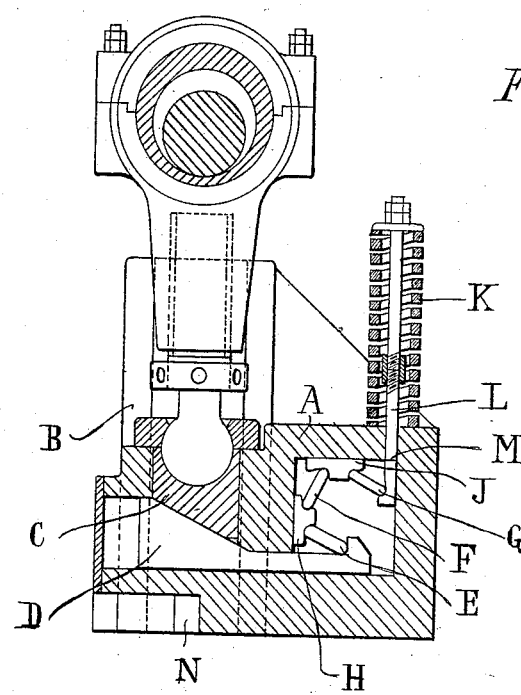
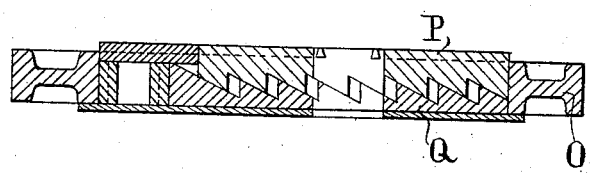
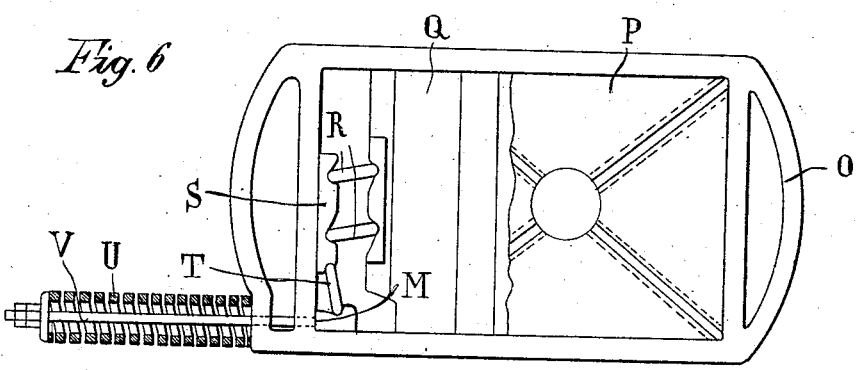
Witnesses:
Harry F. Rueth
G. M. Copenhaver
Inventor:
Leo Knöchl
by Pennie & Goldsborough
Attys

UNITED STATES PATENT OFFICE.

LEO KNÖCHL, OF VIENNA, AUSTRIA-HUNGARY.

ABUTMENT-PRESSURE REGULATOR.

No. 868,995.      Specification of Letters Patent.      Patented Oct. 22, 1907.

Application filed January 26, 1907. Serial No. 354,320.

*To all whom it may concern:*

Be it known that I, LEO KNÖCHL, a subject of the Emperor of Austria-Hungary, residing at Vienna, XX., Petraschgasse No. 4, Lower Austria, in the Empire of Austria-Hungary, have invented new and useful Improvements in or Relating to Abutment-Pressure Regulators, of which the following is a specification.

In cases where abutment pressure should not exceed a certain admissible maximum, it is necessary to make provision to divert it from the abutment on the said maximum being reached, so as to avoid further increase of pressure. Such an arrangement is, for instance, necessary in eccentric presses or rolling mills. Pressure regulators as heretofore known mainly consist of levers, wedges and the like, arranged between the parts pressing on each other, and yielding on the pressure reaching the admissible maximum, owing to suitable springs or weights. These pressure regulators have, however, numerous serious drawbacks which considerably limit the field of their application. For great pressures, the pressure regulator has to have a great leverage, which means that the ratio of transmission of the movement is just as great, so that to a small movement of the regulator arranged between the pressing parts, a great movement of the spring or of the weights corresponds. This great ratio of transmission of movement may become so unfavorable that it is altogether impossible to carry it out in practice. In the case of springs, there is also the drawback that the force of springs considerably increases when the deformation is considerable, so that, if the spring can at all stand such great deformation, the pressure regulator does not prevent the permissible maximum of the pressure from being exceeded, the said maximum, on the contrary, continuously increasing to the same extent as the tension of the spring. The consequence is that either the springs or the standards, bearings etc., must break.

If it be desired to avoid the above drawbacks, the pressure regulator must be constructed in such manner that, first of all, the admissible maximum pressure could never be exceeded, and secondly, that the ratio of transmission of movement should not produce practically inadmissible deformation or movements of the load or weight however great is the movement of the pressure regulator.

The pressure regulator according to the present invention not only complies with the above mentioned conditions but also works in such a manner that, after the maximum pressure has been reached, even if the forces which would have been followed by further increase of pressure, continue to increase, the pressure becomes smaller, that is to say, the apparatus is relieved.

Figure 2:
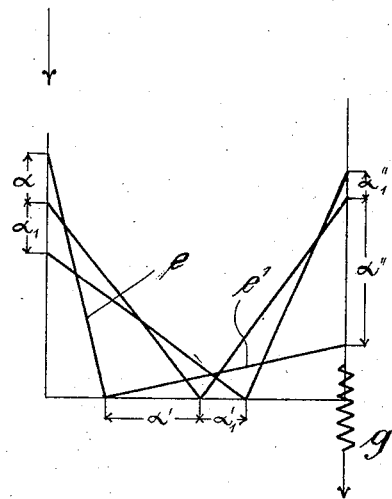
Figure 3:
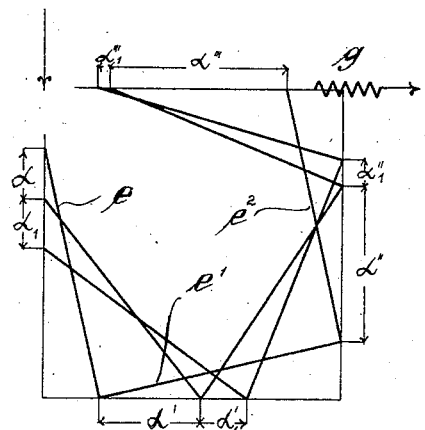

In the accompanying drawings, Figure 1 is a conventional representation of an old type of abutment pressure regulator. Fig. 2 is a diagram illustrating one phase of the present invention. Fig. 3 is a diagram illustrating another application of the invention. Fig. 4 is a side elevation, partly in section, of portions of a power press to which the invention is applied. Figs. 5 and 6 are a vertical section and plan, respectively, of another construction of pressure regulator embodying the invention.

Let us now consider the action of a pressure regulator as applied to an eccentric press. The pressure regulator may be built either in the vertically reciprocated carriage or in the support, in such manner that one or the other part can yield when, owing to excessive thickness of the material to be operated on, the press is likely to be damaged. Let us assume that the carriage or slide $a$ driven by the eccentric (see diagrammatic Fig. 1) consists of two parts $b$ and $c$, adjustable relatively to each other in the direction of movement, the part $b$ being connected to the eccentric rod $d$. Between the two parts $b$ and $c$ is arranged a rod $e$ which rests at the top against the part $b$, and at the bottom against a horizontally adjustable bearing $f$ on which a spring $g$ acts in such manner that it has the tendency always to bring the rod $e$ into vertical position, which, however is prevented by a stop. During the descent of the press carriage, and when the work treated is of normal thickness, the suitably dimensioned spring will always keep the rod in the position shown in the drawing. If, however, an excessively thick piece of work is placed in the machine a horizontal component of the force exercised by the eccentric, will shift the bearing $f$ towards the left and the spring $g$ will yield. In this construction—which is substantially well known—owing to the steeply inclined initial position of the rod $e$, even when the part $b$ moves very little nearer to the part $c$, the path of the bearing $f$ will be fairly great and consequently the deformation of the spring $g$ very considerable. As already stated this considerable deformation of the spring gives rise to an undesirable increase of tension and if the eccentric has not completed its bottom stroke, and the carriage is pushed further downwards during further revolution of the eccentric, the resistance which the carriage will meet, even after the pressure regulator has become operative, will become greater and greater and find its maximum only at the end of the stroke. The maximum pressure will, therefore, vary according to the thickness of the work. If therefore, we start from this steep initial position of the rod $e$, the pressure between the tool and the work, within the limits of the variability of the thickness of the work that need be considered, will continue to increase up to the end of the stroke. In the case of thick work, the pressure may get so great, that either the spring, or the press standard, or some other part, will break. In other words, the pressure regulator will prevent the maximum pressure from being exceeded only within narrow limits.

The abutment pressure will always be represented by the vertical component of the spring force, and the steeper the inclination of the rod, the greater will be the vertical component compared to the spring force itself. It is true that when the rod is brought into oblique position by the excess of pressure, this vertical component would become smaller if the spring force remained constant. When the rod is in the steeply inclined position, a very small vertical movement of the upper end of the rod will result in much greater horizontal movement of the bottom end, whereby the spring will be brought into a state of considerable tension. As, therefore, the force of the spring which can be analyzed into a component in the direction of the rod, and into a vertical component, has become considerably greater than it was in the steeper position of the rod, no decrease of the component acting as the abutment pressure, but on the contrary an increase must be expected. These conditions change, however, if the inclination of the rod to the horizontal is made smaller. The difference between the vertical path of the upper and the horizontal path of the bottom end of the rod become smaller, and after the angle of 45° has been passed, the proportion is even reversed. Naturally, the ratio of the transmission of power is also reversed, that is to say, the spring force required for maintaining equilibrium, will be greater than the abutment pressure; the abutment pressure will become smaller than it was at the beginning of the action of the regulator. If therefore, we start from an initial position of the rod, the inclination of which is between 50 and 60° then the deformation of the spring and the increase of pressure will be more favorable. But owing to the small ratio of transmission between the eccentric force and the force of the spring, the spring would have to be very strong, sometimes stronger than it would be possible to make it in practice. If it is assumed for a moment that such a construction were possible then one would have the advantage that the changes of the tension of the pressure regulator of the spring during the action of the pressure regulator would be much smaller, and that, on a certain oblique position of the rod being reached, the abutment pressure would decrease in spite of the continuation of the eccentric travel.

The above considerations have led to the following invention: if the steeply inclined rod $e$ (Fig. 2) is made to act on a second rod $e'$ arranged in a correspondingly steep position, and only the latter on the part $c$, and if this second rod $e'$ is held balanced by a spring, then the transverse movement of the bearing $f$ will be equal to the longitudinal movement of one end of the second rod, and the other end of it would therefore, make a greater transverse movement than the second end of the first rod.

$$\alpha < \alpha' < \alpha''$$

The rod $e'$ comes, therefore, more quickly than the rod $e$, into the position in which the ratio of transmission between the eccentric force and the tension of the spring, is reversed and the deformation of the spring decreased.

$$\alpha = \alpha'$$
$$\alpha > \alpha', > \alpha'',$$

Even therefore, if the deformation of the spring in the beginning was greater, and the tension of the spring slightly increased, the deformation and the increase of pressure will soon become smaller. But in any case that, which was possible in the case of an oblique rod only with a very strong spring, is now attained with a much weaker spring since there is in this case double transmission of force. It is true that in the beginning the spring will be subjected to a slightly greater tension, but immediately afterwards the tension will become smaller and smaller, so that there can be no question of any noticeable increase of pressure. Therefore with a much weaker spring the same thing can be attained as would require, with a single oblique rod, a practically inadmissible spring, and even then could not be attained in a similarly perfect manner.

The working will be still more perfect as may be seen from Fig. 3 if the second rod be combined with a third one. This third rod $e''$ comes still more quickly into that oblique position, at which a decrease of pressure begins to take place with approximately constant spring deformation and tension during further descent of the upper part $b$ of the slide, and to this must be added the advantage that by a third transmission of power, the spring can be made still weaker. It is evident that there would be no difficulty in still further multiplying the transmission. In any case, the above mentioned construction insures that the approximately fixed maximum deformation of the spring, within the limits of practical construction, determines the maximum abutment pressure which cannot be exceeded; when this maximum pressure has been reached any further continuation of the stroke brings about a release of pressure. The construction also provides means for approaching that ideal state in which a deformation of the spring does not take place at all. If, namely, the last of the rods is from the very beginning given a very oblique position, then the end engaged by the spring, in spite of the great movement of the other end of the rod, will make only a very small movement. It is true that a portion of the transmission of power is lost thereby, but it is in the hands of the designer to obtain a practically possible spring by suitably selecting the total transmission conditions. The increase of tension produced by the small deformation of such a spring, can be practically neglected in view of the large pressures dealt with in these cases. Practically speaking, the regulator will work without increase of pressure and without deformation of spring, and on the maximum admissible pressure being reached, it will at once produce a decrease of pressure.

Fig. 4 shows a form of construction of a press carriage with a pressure regulator of the kind described. In the casing A of the carriage B, a bearing C, for the ball head of the eccentric rod is mounted in a vertically adjustable manner. The bearing C is tapered at the bottom and rests on a horizontally adjustable wedge D which projects by means of a hook-shaped extension into the second compartment of the casing A in which the pressure regulator is mounted. The latter consists of rods E, F and G, connected together by the adjustable bearings H and J. The first rod E engages with the hook of the wedge D, and the last rod G with the hook of the rod L loaded with the spring K. The arrangement of the wedge D has a twofold object in view; first of all, the wedge makes possible a very simple transmission of pressure to the regulator, and secondly the wedge itself can reduce the pressure. The limit for the movement of the pressure regulator is constituted by a stop M which prevents the rods from being moved into extreme position from which the spring could no longer bring them back into the original position. For reducing the initial abutment pressure, which the rods exercise on their bearings, and the latter again on their path, the rods and the bearings are made as wide as possible, which, in the construction of the press illustrated does not present any difficulties. The whole casing is closed on all sides, and filled with oil. The tool is fixed at N.

Figs. 5 and 6 show in vertical section and plan another construction of a pressure regulator embodying the invention which is here arranged in a frame O which can be fitted on any existing eccentric press, for instance, on the table. In the frame a vertically adjustable plate P is arranged provided at the bottom with wedge shaped ribs, below which is arranged a second horizontally adjustable plate Q also provided with wedge-shaped ribs. These ribs fit in the grooves between the ribs of the upper plate P. The plate Q is adjustable in the direction at right angles to the wedge-shaped ribs, but is held balanced by the rods R R which, on the one hand rest against the plate, and on the other hand against a bearing S adjustable in the frame. Against the same bearing rests also the rod T which, on the other hand, engages with a hook of the rod V loaded with a spring U. The tool is fixed to the plate P. When the pressure becomes excessive, the plate P is moved slightly downwards, and by means of the wedge-shaped ribs presses the plate Q towards the left, so that the pressure regulator becomes operative in the manner already described. The rods R come into a more oblique position and move the bearing S which, in its turn, acts on the rod T controlled by the spring U. Of course, in this case as well, a third rod might be arranged if it were desired to have a higher ratio of transmission. The constructive arrangement of the regulator can, of course, be altered in many ways, without departing from the spirit of this invention.

The construction of a pressure regulator embodying this invention, for other applications, such as for bearings exposed to strongly increasing pressures, for instance for bearings for rolling mills, for shears, bending machines etc., will be clearly understood from the above mentioned examples.

Having now particularly described and ascertained the nature of my said invention and in what manner the same is to be performed, I declare that what I claim is:—

1. In an abutment pressure regulator for eccentric presses, rolling mills, shears, bending machines and the like, the combination of one of the parts under pressure, a serise of angularly disposed rods, the first of which is connected to the machine part, means exerting a force in opposition to the pressure and connected to the final rod of the series, and movable guide bearings between adjacent rods; substantially as described.

2. In an abutment pressure regulator for eccentric presses, rolling mills, shears, bending machines and the like, the combination of one of the parts under pressure with a series of two or more angularly disposed rods, a wedge actuated by the machine part which receives the abutment pressure and engaged by the first rod of the series, a spring acting in opposition to the pressure and connected to the final rod of the series, and a guide bearing between the ends of adjacent rods; substantially as described.

3. In an abutment pressure regulator for eccentric presses, rolling mills, shears, bending machines and the like, the combination of one of the parts under pressure, a series of two or more angularly disposed rods, the first of which is connected to the machine part, means exerting a force in opposition to the pressure and connected to the final rod in the series, sliding bearings for the ends of adjacent rods, and guides for said bearings; substantially as described.

4. In an abutment pressure regulator for eccentric presses, rolling mills, shears, bending machines and the like, the combination of one of the parts under pressure, a series of two or more angularly disposed rods, a wedge actuated by the machine part which receives the abutment pressure and engaged by the first rod of the series, a spring acting in opposition to the pressure and connected to the final rod of the series, sliding bearings for the ends of adjacent rods, and guides for said bearings; substantially as described.

5. In an abutment pressure regulator for eccentric presses, shears, bending machines and the like, the combination of a frame, two plates within this frame provided with coacting wedge shaped ribs, one of said plates being movable in a direction perpendicular to the plane of the frame, a series of two or more angularly disposed rods, the first of which engages the movable plate and has a sliding connection with the frame, a spring acting in opposition to the pressure and connected with the final rod of the series, and guide bearings for the ends of the said rods; substantially as described.

In testimony whereof I affix my signature, in presence of two subscribing witnesses.

LEO KNÖCHL.

Witnesses:
  SIEGFRIED NEUTRA,
  ALVESTO S. HOGUE.